(12) United States Patent
Mandon

(10) Patent No.: US 6,241,144 B1
(45) Date of Patent: Jun. 5, 2001

(54) FRICTION FIT TAB AND SLOT SHAPE

(75) Inventor: Stephane L. Mandon, La Murette (FR)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/410,477

(22) Filed: Sep. 30, 1999

(51) Int. Cl.$^7$ .......................... B23K 31/00; B23K 31/02; A01B 15/00
(52) U.S. Cl. .......................... 228/135; 228/170; 172/762
(58) Field of Search .................. 228/170, 135; 172/762

(56) References Cited

U.S. PATENT DOCUMENTS

| | | |
|---|---|---|
| 1,484,579 | 2/1924 | Still . |
| 4,986,430 | * 1/1991 | Dutt ...................................... 215/253 |
| 5,190,207 | 3/1993 | Peck et al. ........................... 228/170 |
| 5,249,818 | 10/1993 | Patterson ........................... 280/281.1 |
| 5,489,230 | * 2/1996 | Gavula, Jr. .......................... 446/109 |
| 5,586,593 | * 12/1996 | Schwartz ............................. 160/135 |
| 5,647,557 | * 7/1997 | Faulkner ............................. 242/607.1 |
| 5,812,623 | * 9/1998 | Holden et al. ........................ 376/260 |
| 5,881,821 | 3/1999 | Noonan et al. ...................... 172/762 |
| 5,895,306 | * 9/1998 | Cunningham ........................ 446/108 |
| 5,926,366 | * 7/1999 | Collins et al. ........................ 361/685 |

* cited by examiner

*Primary Examiner*—Patrick Ryan
*Assistant Examiner*—Zidia T. Pittman
(74) *Attorney, Agent, or Firm*—Larry G. Cain; Liza J. Meyers

(57) ABSTRACT

An apparatus and method for positioning a first piece relative to a second piece in a predefined position is disclosed. This apparatus has a tab and a slot. The tab projects from one of the first piece and the second piece and defines a preestablished configuration having a plurality of surfaces. The slot is positioned in the other one of the first piece and the second piece and defines a preestablished configuration having a plurality of surfaces. At least one of the plurality of surfaces of the tab and of the slot is defined by a generally arcuate configuration. At least one of the plurality of surfaces of the tab is in a frictional contacting relationship with at least one of the plurality of surfaces of the slot.

14 Claims, 1 Drawing Sheet

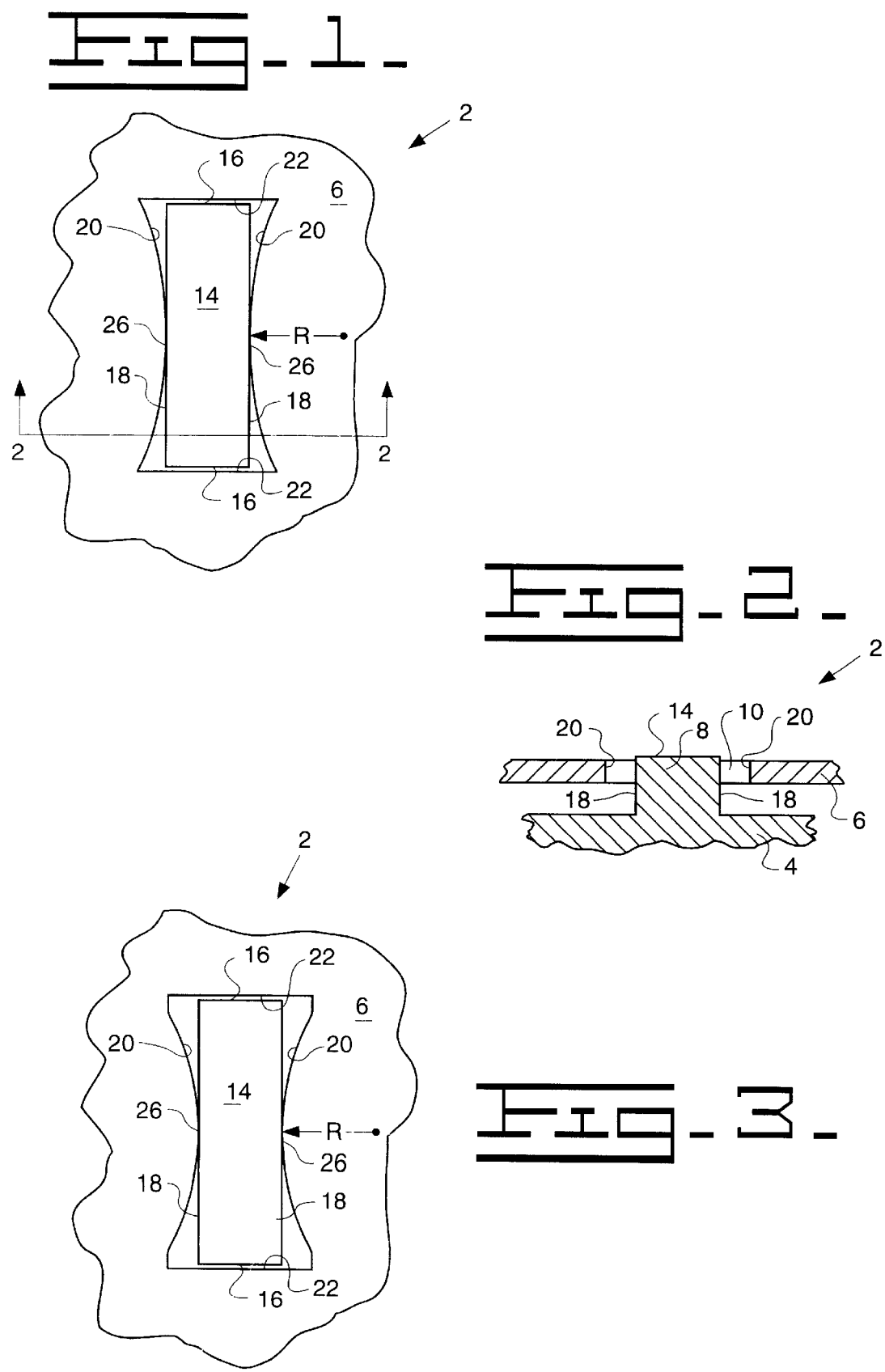

FRICTION FIT TAB AND SLOT SHAPE

TECHNICAL FIELD

The present invention relates generally to the positioning of two pieces of material in a preestablished position and more specifically to the use of a tab and a slot having a precise configuration for maintaining the two pieces in the preestablished position.

BACKGROUND ART

It is common in many different manufacturing processes to require that pieces of an assembly be located in a precise orientation, either temporarily or permanently. One widely-used method to accomplish this positioning is a tab and a slot type joint. In this type of assembly joint, the slot is formed in one of the pieces and the tab is formed in the other of the pieces to be mated. Normally, the tab and the slot combination is designed to achieve a noncontacting fit ensuring ease of assembly. Each of the slot and the tab is sized so that the tab will slide easily into the slot. In such applications, a rectangular cross-sectional configuration is used for each of the tab and the slot. The tab and slot method is normally, but not necessarily, used to connect pieces in a perpendicular orientation.

There are two main methods used to connect the pieces using the tab and slot joint. A first widely used method is to simply insert the tab into the slot. This method is disclosed in U.S. Pat. No. 5,190,207 issued on Mar. 2, 1993 to Peck et al. This method acts to provide a guide for the relative positioning of the pieces. After the initial positioning is established, a fastening method, usually welding, is used to fixedly attach the pieces. For example, the area approximate the tab and the slot are welded, forming a fixed joint. This method has the disadvantage of the pieces being loosely connected prior to being welded. Thus, the positioning of the tab relative to the slot, and vice versa, is imprecise and provides a great variation in the desired preestablished position. The joint resulting from this fastening method gives a loose fit between the tab and the slot prior to welding.

A second commonly used method comprises an elongated tab having a narrowed neck portion located near the intersection of the tab and the piece to be connected which contains the slot. After the tab is inserted into the slot, the elongated portion is rotated about the narrowed neck portion. Thus, the twisted tab cannot pull back through the slot to disassemble the pieces. The pieces are then permanently joined as in the previous method such as by welding. Once the two pieces are more permanently joined, the tab is commonly broken off by severing or tearing at the narrowed neck portion. This second method may be more precise than the previous one, however, the labor needed to twist the tabs and then sever or tear the remainder of the tab is timeconsuming. The scrap produced when forming the elongated tabs and the severed or torn tab is wasteful, as well.

The present invention is directed to overcoming one or more of the problems as set forth above.

DISCLOSURE OF THE INVENTION

In one aspect of the present invention, an apparatus for positioning a first piece relative to a second piece in a predefined position is provided. This apparatus has a tab and a slot. The tab projects from one of the first piece and the second piece and defines a preestablished configuration having a plurality of surfaces. The slot is positioned in the other one of the first piece and the second piece and defines a preestablished configuration having a plurality of surfaces. At least one of the plurality of surfaces of the tab and of the slot is defined by a generally arcuate configuration. At least one of the plurality of surfaces of the tab is in a frictional contacting relationship with at least one of the plurality of surfaces of the slot.

In another aspect of the present invention, a method for positioning a first piece relative to a second piece in a predetermined position is provided. The method comprises the following steps. The steps include forming a tab, the tab projecting from one of the first piece and the second piece and defining a preestablished configuration having a plurality of surfaces; and forming a slot, the slot being positioned in the other one of the first plate and the second plate and defining a preestablished configuration having a plurality of surfaces. At least one of the surfaces of the tab and of the slot is defined by a generally arcuate configuration. In another step, the tab is inserted into the slot. This results in the step of contacting at least one of the plurality of surfaces of the tab with at least one of the plurality of surfaces of the slot in a frictional relationship.

BRIEF DESCRIPTION OF THE DRAWINGS

FIG. 1 is a broken-out view of an embodiment of the present invention.

FIG. 2 is a cross-sectional view of an embodiment of the present invention taken along line 2—2 of FIG. 1.

FIG. 3 is a broken-out view of another embodiment of the present invention.

BEST MODE FOR CARRYING OUT THE INVENTION

Referring to FIGS. 1 and 2, an apparatus 2 for positioning a first piece 4 relative to a second piece 6 in a predetermined position is shown. The apparatus 2 consists of a tab 8 and a slot 10. The tab projects from the piece 4 and is comprised of a plurality of surfaces 14–18 including at least one tab top surface 14, at least one tab end surface 16, and at least one tab side surface 18. The slot 10 is formed from the second piece 6 and is comprised of a plurality of surfaces 20,22 including at least one slot side surface 20 and at least one slot end surface 22. At least one of the surfaces 14–22 has a cross section being defined by a an irregular configuration, such as, but not limited to, an elliptical, hyperbolic, or parabolic configuration. In this application, a radius R is used to form the arcuate configuration. The tab 8 and slot 10 are sized such that there is a slight interference between the two when they are placed in a mating arrangement. This interference results in an intersection 26 between the tab 8 and the slot 10.

For ease of reference, the tab and slot are both shown to have a roughly rectangular configuration with both of the slot side surfaces having a radiused cross-section, but it is obvious to those skilled in the art that any number of combinations of surfaces and radiused surfaces on the tab and the slot will produce a similar result.

FIG. 3 shows an alternative embodiment of the radiused surfaces. Since a constant radius, as shown in FIG. 1, is sometimes difficult to achieve in practice, a graduated radius provides an alternative radiused surface.

This apparatus 2 can be used either alone or in combination with welding or another permanent fastening process to fix the relative position of the pieces in the assembly.

The present invention is directed toward a surface defined by a generally arcuate configuration or radius contacting another surface in a frictional relationship. As should be obvious to one skilled in the art, the surface defined by a radius need not be limited to being a surface of the slot, as shown in the figures, but may instead be a surface of the tab without departing from the essence of the present invention.

For simplicity of explanation, the assembly is discussed as one piece being connected to another piece, although it is obvious that this method could be used with any number of interconnecting pieces having any reasonable shapes, with any number of tab and slot joints.

Industrial Applicability

In practice, first piece 4 and second piece 6 are positioned so that tab 8 and slot 10 are in a position to be mated. Tab 8 is inserted into slot 10. An application of force is necessary in this insertion because of the interference fit of tab 8 and slot 10 at the intersection 26 therebetween. Once tab 8 and slot 10 are fitted together, friction at the intersection 26 holds the first piece 4 and second piece 6 in a predefined relative position until they are moved apart and the tab 8 is removed from the slot 10.

The tab 8 and slot 10 can also be used to hold the first piece 4 and second piece 6 in the predefined relative position. For example, a permanent fastening process such as, but not limited to, welding at the tab 8 and slot 10 joint and/or at another point of direct or indirect contact between the first piece 4 and the second piece 6.

The present invention has several advantages over the prior art. Among these, the present invention can be used to provide a highly accurate relative location of the first piece 4 and the second piece 6. The frictional force between the tab 8 and the slot 10 provides a firm fit. Thus, a predetermined relative location of the pieces is achieved, even if no permanent fastening process has been applied. The waste of time and material inherent in the elongated tab method is avoided because no additional labor is required beyond insertion of the tab 8 into the slot 10. No portion of the present invention need be severed or torn once the relative location of the pieces is fixed through a more permanent fastening process. The generally arcuate configuration of at least one of the surfaces 14–22 reduces the contact area between the tab 8 and the slot 10 and thus reduces the force needed to insert the tab 8 into the slot 10.

Other aspects, objects, and advantages of this invention can be obtained from a study of the drawings, the disclosure, and the appended claims.

What is claimed is:

1. An apparatus for positioning a first piece relative to a second piece in a predefined position, said apparatus comprising:

a tab projecting from one of said first piece and said second piece, said tab being defined by a preestablished configuration having a plurality of surfaces;

a slot being positioned in an other one of said first piece and said second piece, said slot being defined by a preestablished configuration having a plurality of surfaces;

at least one of said surfaces being defined by a generally arcuate configuration;

at least one of said plurality of surfaces of said preestablished configuration of said tab being in frictional contacting relationship with said at least one of said plurality of surfaces of said preestablished configuration of said slot, at least one of said plurality of surfaces of said preestablished configuration of said tab and of said preestablished configuration of said slot being defined by said generally arcuate configuration; and said first piece and said second piece being attached at an intersection, said intersection of said first piece and said second piece forming an interference fit defining said frictional contacting relationship of said first piece and said second piece, said frictional contacting relationship maintaining said first piece and said second piece in a removable and a predefined position.

2. The apparatus, as set forth in claim 1, wherein said tab and one of said first piece and said second piece being integrally formed from a single piece.

3. The apparatus, as set forth in claim 2, wherein said tab being coplanar with one of said first piece and said second piece.

4. The apparatus, as set forth in claim 1, wherein said first piece and said second piece being made from a same material and said material being steel.

5. The apparatus, as set forth in claim 1, wherein said first piece being made from a material and said second piece being made from an other material.

6. The apparatus, as set forth in claim 4, wherein said first piece and said second piece being fastened together by the use of a permanent fastening process at the intersection of said tab and said slot.

7. The apparatus, as set forth in claim 6, wherein the permanent fastening process being a weld.

8. The apparatus, as set forth in claim 5, wherein said first piece and said second piece being fastened together by the use of a permanent fastening means at the intersection of said tab and said slot.

9. The apparatus, as set forth in claim 8, wherein the permanent fastening means being a weld.

10. A method for positioning a first piece relative to a second piece in a predefined position, comprising:

forming a tab, said tab projecting from one of said first piece and said second piece, said tab being defined by a preestablished configuration having a plurality of surfaces;

forming a slot, said slot being positioned in an other one of said first piece and said second piece, said slot being defined by a preestablished configuration having a plurality of surfaces;

at least one of said surfaces being defined by a generally arcuate configuration;

inserting said tab into said slot;

contacting at least one of said plurality of surfaces of said predetermined configuration of said tab in frictional relationship with said at least one of said surfaces of said preestablished configuration of said slot, at least one of said plurality of surfaces of said preestablished configuration of said tab and of said preestablished configuration of said slot being defined by said generally arcuate configuration; and inserting said tab into said slot forming an intersection, said intersection of said tab and said slot forming an interference fit defining said frictional contacting relationship of said tab and said slot, said frictional relationship maintaining said tab and said slot in a removable and a predefined position.

11. The method, as set forth in claim 10, wherein said forming said tab including one of said first piece and said second piece being integrally formed from a single piece.

12. The method, as set forth in claim 10, wherein said forming said tab including one of said first piece and said second piece being coplanar win said tab.

13. The method, as set forth in claim 10, wherein the first piece and the second piece being fastened together by the use of a permanent fastening process at the intersection of said tab and slot.

14. The method, as set forth in claim 13, wherein the permanent fastening process being a weld.

* * * * *